United States Patent
Hsu et al.

(10) Patent No.: US 7,683,115 B2
(45) Date of Patent: Mar. 23, 2010

(54) SILICA REINFORCED RUBBER COMPOSITION AND USE IN TIRES

(75) Inventors: Wen-Liang Hsu, Cuyahoga Falls, OH (US); Leh-Yeh Hsu, legal representative, Cuyahoga Falls, OH (US); Kuo-Chih Hua, Richfield, OH (US); Shingo Futamura, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 73 days.

(21) Appl. No.: 12/029,038

(22) Filed: Feb. 11, 2008

(65) Prior Publication Data

US 2008/0194748 A1 Aug. 14, 2008

Related U.S. Application Data

(60) Provisional application No. 60/900,859, filed on Feb. 12, 2007.

(51) Int. Cl.
*B60C 1/00* (2006.01)
*C08K 5/04* (2006.01)
(52) U.S. Cl. ............................. 524/262; 524/394
(58) Field of Classification Search .............. 524/262
See application file for complete search history.

(56) References Cited

U.S. PATENT DOCUMENTS

| | | | |
|---|---|---|---|
| 2006/0041063 A1* | 2/2006 | Cruse et al. | 525/100 |
| 2007/0142518 A1* | 6/2007 | Hsu et al. | 524/262 |
| 2007/0197812 A1* | 8/2007 | Chaves et al. | 556/427 |
| 2007/0298986 A1* | 12/2007 | Daute | 508/465 |

OTHER PUBLICATIONS

Presentation *NXT Z\* Silane—Processing and Properties of a New Virtually Zero VOC Silane*, by Daniel Gurovich, et al., Presented at the Fall 170th Technical Meeting of the Rubber Division, American Chemical Society, Cincinnati, Ohio, Oct. 10-12, 2006.

\* cited by examiner

*Primary Examiner*—Ling-Siu Choi
*Assistant Examiner*—Hui Chin
(74) *Attorney, Agent, or Firm*—Henry C. Young, Jr.

(57) ABSTRACT

This invention relates to the preparation of silica-containing rubber compositions which contain precipitated silica reinforcement and use of an oligomeric organomercaptosilane coupling agent containing a plurality of mercapto and silane moieties, and a minimal content, if any, of ethoxy groups and is thus substantially free of ethoxy groups. The interaction of the plurality of mercapto moieties, or groups, of such oligomeric organomercaptosilane with the diene-based elastomer can promote a significant viscosity build up of the uncured rubber composition in a preliminary non-productive mixing stage and therefore present significant rubber processing difficulties during the mixing of the rubber composition. A challenge is therefore presented for reducing such viscosity buildup for such uncured silica-containing rubber composition.

3 Claims, No Drawings

SILICA REINFORCED RUBBER COMPOSITION AND USE IN TIRES

The Applicants hereby claims the benefit of prior U.S. Provisional Application Ser. No. 60/900,859, filed on Feb. 12, 2007.

FIELD OF THE INVENTION

This invention relates to the preparation of silica-containing rubber compositions which contain precipitated silica reinforcement and use of an oligomeric organomercaptosilane coupling agent containing a plurality of mercapto and silane moieties, and a minimal content, if any, of ethoxy groups and is thus substantially free of ethoxy groups. The interaction of the plurality of mercapto moieties, or groups, of such oligomeric organomercaptosilane with the diene-based elastomer can promote a significant viscosity build up of the uncured rubber composition in a preliminary non-productive mixing stage and therefore present significant rubber processing difficulties during the mixing of the rubber composition. A challenge is therefore presented for reducing such viscosity buildup for such uncured silica-containing rubber composition.

BACKGROUND OF THE INVENTION

Various rubber compositions for components for various products, such as for example tires, contain particulate reinforcement comprised of a combination of precipitated silica and rubber reinforcing carbon black together with a coupling agent for the silica. Such rubber compositions also conventionally contain a combination of zinc oxide and stearic acid additives.

Various coupling agents have been proposed for coupling the precipitated silica to the diene-based elastomer for such rubber compositions.

Historically, coupling agents have heretofore been proposed which contain one moiety reactive with a precipitated silica (e.g. silanol groups on the silica) and another different moiety interactive with an unsaturated conjugated diene-based elastomer. Such coupling agents may be for example, a bis(3-triethoxysilylpropyl) polysulfide which contains an average of from about 2 to about 4 connecting sulfur atoms in their polysulfidic bridge and, for example, alkoxyorganomercaptosilanes in which at least a portion of its alkoxy moiety is comprised of ethoxy groups.

The alkoxyorganomercaptosilane silica coupling agent may have its mercapto moiety chemically capped, or blocked, to retard promoting an increased viscosity buildup in the preliminary, non-productive, mixing of the rubber composition. The rubber composition conventionally contains an unblocking agent to unblock the chemically blocked mercapto moiety subsequent to the aforesaid non-productive mixing stage to enable the coupling agent to interact with a diene-based elastomer in the rubber composition. Such unblocking agent may be, for example, an amine-containing sulfur cure accelerator added in a non-productive or productive mixing stage.

Such coupling agents typically contain an ethoxy moiety to react with the hydroxyl groups on the precipitated silica and release ethanol as a by-product.

Such coupling agents and their use in precipitated silica reinforcement-containing rubber compositions are well known to those having skill in such art.

In one aspect, such organomercaptosilane based coupling agent may be an oligomeric organomercaptosilane (organo-mercaptosilane oligomer) comprised of plurality of mercapto and silane moieties which contains only a minimal alkoxy group content, if any, particularly only a minimal, if any, alkoxy groups in a form of an ethoxy group, therefore being substantially free of ethoxy groups (and thereby does not release an ethanol by-product to any significant extent upon reaction with hydroxyl groups, for example, silanol groups, of a precipitated silica).

In another aspect, such organomercaptosilane oligomer may also, if desired, have only a portion, of any, of its plurality of mercapto moieties chemically blocked as earlier described in a sense that the unblocked mercapto moieties may interact with diene-based elastomers in the associated rubber composition in a preliminary, non-productive, rubber mixing stage in an internal rubber mixer to thereby increase the mixing viscosity (Mooney viscosity) and cause the processing (e.g. mixing) of the rubber composition to be significantly more energy demanding and difficult.

A challenge is seen herein to utilize such organomercaptosilane oligomer with its plurality of mercapto groups as a coupling agent in a manner which does not excessively increase the mixing viscosity of the rubber composition. A further challenge is to utilize the oligomeric organomercaptosilane in such manner which can also yield a resultant rubber composition with suitable physical properties.

As hereinbefore indicated, diene-based elastomer compositions typically contain a combination of zinc oxide and long chain carboxylic (fatty) acid such as, for example, stearic acid. The combination of zinc oxide and fatty acid (e.g. stearic acid) eventually forms a zinc fatty acid salt (e.g. zinc stearate) in situ within the rubber composition, although it is envisioned herein that a significant portion of the fatty acid (e.g. stearic acid) remains in its fatty acid (e.g. stearic acid) form during a significant portion of the aforesaid non-productive mixing step.

For this invention it has been found unexpectedly, that by a combination of adding the zinc oxide in a non-productive rubber mixing stage, or step, instead of a subsequent productive rubber mixing stage, together with an addition of a greater amount of the fatty acid (e.g. stearic acid) in a sense of equal or greater than equal weight amount of the fatty acid (e.g. stearic acid) relative to the zinc oxide in the non-productive mixing stage of the silica-containing rubber mixing process which contains an inclusion of an oligomeric organo-mercaptosilane coupling agent with a significant portion, particularly at least 30 percent, alternatively at least 50 percent, of its mercapto groups being unblocked, a significant viscosity buildup of the rubber composition is inhibited, or retarded, and a suitable viscosity (e.g. Mooney viscosity) of the unvulcanized rubber composition can be obtained.

A further challenge is presented in a sense that the presence of the sulfur contained in the unblocked mercapto groups for the oligomeric organomercaptosilane coupling agent adds to the presence of the sulfur curative in the rubber composition in a manner that a reduction in the addition of sulfur curative (free sulfur) is, and would be expected to be, necessary to provide suitable crosslink density for the sulfur cured rubber composition as may be evidenced, for example, by its ultimate elongation at break, as well as other desired physical properties.

Although the mechanism is not fully understood, it is envisioned herein that the aforesaid addition of a greater amount of fatty acid (e.g. stearic acid), (equal to or greater than the weight of the zinc oxide) added in the non-productive mixing stage (together with the zinc oxide in a non-productive stage) interacts with the organomercaptosilane oligomer, particularly its unblocked mercapto moieties, to retard the subsequent sulfur curing of the resultant rubber composition and/or coupling of the silica to the diene-based elastomer(s) and thereby negatively affecting various resultant physical properties for the sulfur cured rubber composition, including the sulfur crosslink density of the cured rubber composition as indicated by its ultimate elongation (elongation at break), a well known physical property to those having experience in such art.

Accordingly, it has further been discovered that while such aforesaid controlled zinc oxide and fatty acid, particularly stearic acid addition in the non-productive mixing step(s) can enable a preparation of a precipitated silica reinforced rubber composition having a Mooney viscosity which is suitably processable in its uncured condition, it has further been discovered that such phenomenon, when combined with an increase, rather than a decrease, in addition of sulfur curative (e.g. by not reducing the addition of sulfur curative) can enable a production of a precipitated silica reinforced rubber composition which is both suitably processable (e.g. having a suitable Mooney viscosity) in its uncured condition but also has an improved crosslink density and various suitable physical properties in its subsequently sulfur cured condition.

Accordingly, it is considered herein that this aspect of the invention does not rely upon simply adding sulfur to obtain an increased crosslink density for the sulfur cured rubber composition in a vacuum, but, instead, relies upon first recognizing the aforesaid problem caused by the additional fatty acid, particularly stearic acid, additive interacting with the plurality of mercapto groups of the oligomeric organomercaptosilane in the non-productive mixing stage to cause a reduction in crosslink density combined with solving the problem by the addition of a greater than expected amount of sulfur curative.

From an historical perspective, a long chain carboxylic (fatty) acid for use in preparation of rubber compositions is typically stearic acid which, in practice, is typically comprised of at least about 90 weight percent stearic acid and minor amounts (less than 10 weight percent) of other long chain carboxylic fatty acids typically including palmitic acid and oleic acid. For this invention, such fatty acid is referred to as being "stearic acid" even though it is considered herein as typically being somewhat impure and being comprised of at least 90 weight percent stearic acid and less than 10 percent of other long chain fatty acids such as for example, primarily palmitic and oleic acids.

Alternatively, a long chain carboxylic acid (fatty acid) may be comprised of, for example, at least one of fatty acid derivatives comprised of fatty acid polyol, fatty acid ester, fatty acid glyceride, fatty acid amide, fatty acid amino acid, and zinc fatty acid soap, and their combinations.

In practice, sulfur vulcanized elastomer products are typically prepared by thermomechanically mixing rubber and various ingredients in a sequentially step-wise manner followed by shaping and curing the compounded rubber to form a vulcanized product.

First, for the aforesaid mixing of the rubber and various ingredients, typically exclusive of sulfur and sulfur vulcanization accelerators, the elastomer(s) and various rubber compounding ingredients are typically blended in one or more thermomechanical mixing stage(s) in suitable mixers, in the absence of sulfur and sulfur vulcanization accelerator(s), which is generally referred to as "non-productive mixing steps". Such non-productive mixing is usually conducted at elevated temperatures within a range of about 140° C. to 190° C. and often within a range of about 150° C. to 180° C.

Following and subsequent to such non-productive mixing stage, or stages, the rubber composition is mixed in a final mixing stage, sometimes referred to as a "productive mix stage", where sulfur and sulfur vulcanization accelerators (curatives), and sometimes optionally one or more additional ingredients, are mixed with the rubber composition, typically at a significantly lower temperature in a range within about 100° C. to about 120° C., which is a lower temperature than the temperatures utilized in the non-productive mix stages in order to prevent or retard premature curing of the sulfur curable rubber, which is sometimes referred to as scorching, of the rubber composition.

The rubber mixture, or composition, is typically allowed to cool, sometimes before or after intermediate mill mixing of the rubber composition, between the aforesaid various mixing steps, for example, to a temperature below 50° C.

Such sequential non-productive mixing steps, including the intermediary mill mixing steps and the concluding final productive mixing step are well known to those having skill in the rubber mixing art.

By thermomechanical mixing, it is meant that the rubber compound, or composition of rubber and rubber compounding ingredients, is mixed in a rubber mixture under high shear conditions where the mixture autogeneously heats up, with an accompanying temperature rise, as a result of the mixing primarily due to shear and associated friction within the rubber mixture in the rubber mixer.

One and often two or more of such aforesaid sequential non-productive (NP) mixing stages, or steps, usually in an internal rubber mixer, at elevated temperatures are used, followed by an aforesaid productive (PR) mixing stage at a lower temperature.

This invention is focused on the use of an oligomeric organomercaptosilane based coupling agent for a silica (e.g. precipitated silica)-containing diene-based elastomer rubber composition in combination with the use of an aforesaid specified addition of a combination of zinc oxide and fatty acid comprised of stearic acid.

It is considered herein that a significant aspect of this invention is the use of an oligomeric organomercaptosilane (which contains a plurality of mercapto and silane moieties, with a portion of the mercapto moieties being optionally chemically blocked) in combination with specific amounts and controlled introduction of zinc oxide and stearic acid in a non-productive mixing stage(s) in silica-containing (e.g. precipitated silica) diene-based elastomer rubber compositions. A further aspect is the use of an adjusted sulfur addition in the subsequent productive mixing stage.

It is considered herein that such aspect of this invention involves use of abnormal amounts of the stearic acid in conjunction with more normal amounts of zinc oxide wherein both the zinc oxide and stearic acid are added to the rubber composition in at least one non-productive mixing stage, coincidentally with, or preferably prior to the addition of the oligomeric organomercaptosilane and, also, preferably coincidentally with or prior to the addition of the precipitated silica.

It is considered herein that such aspect of the invention is therefore a significant departure from use of more conventional preparation of silica-containing rubber composition.

The term "phr" as used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms such as "rubber composition", "compounded rubber" and "rubber compound", if used herein, are used interchangeably to refer to rubber which has been blended or mixed with various ingredients and materials and "rubber compounding" or "compounding" may be used to refer to the mixing of such materials. Such terms are well known to those having skill in the rubber mixing or rubber compounding art.

SUMMARY AND PRACTICE OF THE INVENTION

In accordance with this invention, a method of preparing a rubber composition comprises the sequential steps of, based upon parts by weight per 100 parts by weight rubber (phr):

(A) thermomechanically mixing in at least one non-productive (in the absence of sulfur and sulfur cure accelerator) mixing step in an internal rubber mixer to a temperature within a range of about 140° C. to about 190° C., alternatively within a range of about 150° C. to about 180° C., (such as for example, for a total collective non-productive mixing step time of about 2 to about 20, alternatively about 3 to about 15, minutes) for such mixing step(s):

(1) 100 parts by weight of at least one sulfur vulcanizable diene-based elastomer selected from conjugated diene homopolymers and copolymers and copolymers of vinyl aromatic compound (e.g. styrene) and at least one conjugated diene;

(2) about 10 to about 120, alternatively about 15 to about 120, phr of particulate reinforcing filler comprised of precipitated silica and rubber reinforcing carbon black, wherein said reinforcing filler contains from 10 to about 110, alternatively from 20 to about 100, weight percent precipitated silica;

(3) an oligomeric organomercaptosilane based coupling agent, and (4) combination of zinc oxide and long chain carboxylic (fatty) acid such as, for example, stearic acid composed of;

(a) from 1 through 7 phr of zinc oxide and from 2 through 8 phr of long chain fatty acid (e.g. stearic acid), wherein the weight ratio of said long chain fatty acid (e.g. stearic acid) to zinc oxide is at least 1/1, or (b) from 1 through 3 phr of zinc oxide, and from 2 through 8 phr of long chain fatty acid (e.g. stearic acid), wherein the weight ratio of long chain fatty acid (e.g. stearic acid) to zinc oxide is at least 1/1, or (c) from 1 through 3 phr of zinc oxide and from 2 through 5 phr of long chain fatty acid (e.g. stearic acid), wherein the weight ratio of long chain fatty acid long chain fatty acid (e.g. stearic acid) to zinc oxide is at least 1/1;

wherein said zinc oxide and said long chain fatty acid (e.g. stearic acid) are mixed with said diene-based elastomer(s) in at least one non-productive mixing step in an internal rubber mixer and wherein said zinc oxide and said long chain fatty acid (e.g. stearic acid) are added coincidentally with or prior to the addition of said oligomeric organomercaptosilane;

(B) subsequently blending therewith (blending with the resultant rubber composition of said non-productive mixing steps), in a subsequent thermomechanical mixing step (pro-ductive mixing step) at a temperature in a range of about 100° C. to about 120° C., (preferably for a period of, for example, about 1 to about 3 minutes), elemental sulfur and at least one sulfur vulcanization accelerator;

wherein said oligomeric organomercaptosilane is comprised of a plurality of mercapto and silane moieties and wherein from zero to about 100, alternately from 30 to 100, or alternately from 50 to 100, percent of said mercapto groups are not chemically blocked.

In one aspect, while various oligomeric organomercaptosilanes may be used, it is envisioned herein that an exemplary oligomeric organomercaptosilane may, for example, be the product of reacting a hydrocarbon-based diol (e.g. 2-methyl-1,3-propane diol) with S-[3-(triethoxysilyl)propyl] thiooctanoate as mentioned in U.S. Patent Application SN2006/0041063 A1 which is incorporated herein in its entirety. It is considered herein that alternately, said oligomeric organomercaptosilane may be a product of said diol and S-[3-(trichlorosilyl)propyl] thiooctanoate.

In another aspect is envisioned herein that such organomercaptosilane oligomer may be comprised of, for example, a generalized illustrative structure (I):

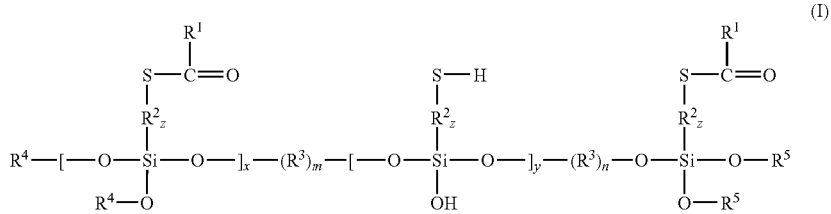

wherein $R^1$ is a hydrocarbon radical containing from 4 to 10 carbon atoms, preferably an alkyl radical and preferably containing 7 carbon atoms;

wherein $R^2$ is an alkylene radical containing from 3 to 6 carbon atoms, preferably 4 carbon atoms;

wherein $R^3$ is an alkylene radical containing from 3 to 8 carbon atoms, preferably 4 carbon atoms;

wherein the $R^4$ radicals are the same or different alkyl radicals containing from 3 to 8 carbon atoms;

wherein the $R^5$ radicals are:

(A) the same or different alkyl radicals containing from 3 to 8 carbon atoms, or (B) combined to form an individual alkyl radical, which may be a branched or unbranched alkyl radical, having from 3 to 8 carbon atoms.

wherein z is a value in a range of from 3 to 6, wherein the total of x and y is at least 3, which may be, for example, in a range of from 3 to about 15 or more;

wherein m and n are each values in a range of from 3 to 8.

It is contemplated that the various alcohol groups are reactive with hydroxyl groups (e.g. silanol groups) contained on the precipitated silica and, further, (because they contain more than 2 carbon atoms) do not liberate ethanol (as a byproduct) upon reacting with said hydroxyl groups on said precipitated silica.

Oligomeric organomercaptosilanes contemplated herein are discussed in "NXT Z Silane—Processing and Properties of a New Virtually Zero VOC Silane" by D. Gurovich, et al., presented at the Fall 170th Technical Meeting of the Rubber Division, American Chemical Society, on Oct. 10-12, 2006 at Cincinnati, Ohio, which presentation is incorporated herein in its entirety.

Oligomeric organomercaptosilanes contemplated herein are discussed in "GE's New Ethanol Free Silane for Silica Tires" report by Antonio Chaves, et al., presented at an ITEC year 2006 Conference on Sep. 12-14, 2006 as ITEC 2006 Paper 28B at Akron, Ohio, which refers to NXT Z™, which presentation is incorporated herein in its entirety As previously discussed, for this invention, it is envisioned that use of an oligomeric organomercaptosilane which contains at least 40, and alternately at least 60, and even more alternately at least 80 percent of its plurality of mercapto groups, or moieties, in an unblocked state promotes formation of a relatively high, and usually an unsuitably high, (Mooney 100° C.) viscosity during the aforesaid non-productive rubber mixing stage for the combination of rubber, precipitated silica and organomercaptosilane oligomer.

For this invention, in one aspect, the weight ratio of said long chain fatty acid (e.g. stearic acid) to zinc oxide is preferably at least 1/1 and more preferably in a range of from at least 1.1/1 to about 1.5/1. Therefore the weight of the stearic acid is at least equal to and preferably greater than the weight of the zinc oxide.

In one aspect of the invention such process is provided wherein said non-productive mixing is conducted in at least one, alternately at least two, thermomechanical mixing steps, of which at least two of such mixing steps are conducted to a temperature in a range of about 140° C. to about 190° C., with intermediate cooling of the rubber composition between at least two of said mixing steps to a temperature below about 50° C.

As previously discussed, a significant aspect of the process of this invention is the use of the oligomeric organomercaptosilane (organomercaptosilane oligomer) based coupling agent in a precipitated silica-rich diene-based elastomer composition in the presence of the controlled addition and combination of zinc oxide and stearic acid in the non-productive mixing stage(s).

As previously discussed, a further significant aspect of this invention is the adjusted sulfur cure system, namely the additional sulfur addition, namely addition of free sulfur, in the productive mixing step in a sense of providing a similar state of cure, or cross-link density, of the sulfur cured rubber composition as compared to a similarly sulfur cured rubber composition which does not contain the additional long chain (fatty) acid (e.g. stearic acid) in the sense of fatty acid/zinc oxide weight ratio of at least 1/1, as may typically evidenced by the sulfur cured rubber composition's elongation at break (ultimate elongation) being within about 15 percent of, preferably within about 10 percent of the elongation at break of said similarly sulfur cured rubber composition. Accordingly, in one aspect of the practice of this invention, additional free sulfur is added in the productive mixing step in combination with said long chain fatty acid and said long chain fatty acid/zinc oxide ratio of at least 1/1 (to compensate for said sulfur cross-link density reduction caused by the presence of the elevated amount of fatty acid and said fatty acid/zinc oxide ratio taken with said unblocked mercapto groups of said oligomeric organomercaptosilane coupling agent) in an amount to suitably enhance the sulfur cross-link density of the sulfur vulcanized rubber composition.

An additional significant aspect of this invention is the requirement that said zinc oxide and said stearic acid are both added in one of said non-productive steps (both mixed in a non-productive mixing step and therefore exclusive of adding the zinc oxide and fatty acid (e.g. stearic acid) in a subsequent productive mixing step) in an internal rubber mixer prior to or in combination with the organomercaptosilane oligomer coupling agent. The purpose is to ensure that the combination of the zinc oxide and fatty acid (e.g. stearic acid) are present with the organomercaptosilane oligomer based coupling agent in a same non-productive mixing step to allow a full effect of utilization of the required restrictive amounts of the zinc oxide and fatty acid (stearic acid). Such method is desired to prevent, for example, the fatty acid (e.g. stearic acid) to be allowed to be selectively mixed with the organomercaptosilane oligomer in a non-productive mixing step to the absence of, or exclusion of, an addition of the zinc oxide in the same mixing step.

While a combination of zinc oxide and fatty acid, particularly stearic acid, are well known rubber compounding ingredients, it is considered herein that their aforesaid controlled addition in their required amounts with the organomercaptosilane oligomer coupling agent is novel in a non-productive mixing stage and is a departure from past practice.

Historically, it is understood that, for preparation of diene-based elastomer compositions, stearic acid is typically used in relatively limited amounts which is conventionally less (weight-wise) than the zinc oxide and thus usually in a weight ratio of stearic acid to zinc oxide of significantly less than 1/1. This is considered herein to be because excess stearic acid is envisioned as tending to migrate to the surface of the rubber composition and create a surface bloom thereon with a resultant loss in surface tack of the uncured rubber composition and, further to inhibit or retard cured adhesion of the rubber composition to other rubber compositions (other rubber components).

However, in the case of a precipitated silica-rich diene-based elastomer composition, it is understood herein that such tendency of stearic acid to migrate to the rubber surface is reduced, or somewhat retarded or inhibited, apparently due to presence of the precipitated silica in the rubber composition.

As a result, it was found unexpectedly that by increasing the fatty acid, particularly stearic acid, content of the rubber composition, so long as a basic threshold, or amount, of the zinc oxide is present relative to the stearic acid, in the precipitated silica reinforced rubber composition which also contains the aforesaid organomercaptosilane oligomer coupling agent, the viscosity build up of the uncured rubber composition while being mixed in an internal rubber mixer is significantly retarded, particularly when the zinc oxide and stearic acid are added in the same mixing step and are therefore added in the presence of each other and the organomercaptosilane oligomer coupling agent, particularly where the oligomer coupling agent has at least 30, alternately at least 50, percent mercapto groups in an unblocked state or condition, instead of being added sequentially in separate individual mixing steps.

Indeed, such practice is believed to be a relatively simple but substantial and significant departure from past practice of utilizing well known rubber compound ingredients such as zinc oxide, stearic acid, precipitated silica together with the organomercaptosilane oligomer coupling agent in a novel sequential manner to achieve sought after results, namely a reduced or retarded rubber viscosity built up during the mixing of the rubber composition in an internal rubber mixer.

In practice, various primary sulfur cure accelerators may be used in this invention such as, for example a sulfenamide based accelerator, representative of which are, for example, N-cyclohexylbenzothiazole-2-sulfenamide, N-tert-butyl-2-benzothiazole sulfonamide, N-dicyclohexyl-2-benzothiazole sulfonamide or N,N'-diisopropylbenzothiazole-2-sulfenamide, of which the N-cyclohexylbenzothiazole-2-sulfenamide may be preferred.

In practice, a representative secondary sulfur cure accelerator is, for example, diphenylguanidine as well as alternatively zinc dibenzyldithiocarbamate, of which the diphenylguanidine may be preferred.

In practice, an optional tertiary sulfur cure accelerator is, for example, tetrabenzylthiuram disulfide as well as alternatively tetramethylthiuram disulfide, of which the tetrabenzylthiuram disulfide may be preferred.

In further accordance with this invention, a rubber composition is provided having been prepared by the aforesaid process of this invention.

In further accordance with the invention, the process comprises the additional step of vulcanizing the prepared rubber composition at a temperature in a range of about 140° C. to about 190° C.

Accordingly, the invention also thereby contemplates a rubber composition, particularly a sulfur vulcanized rubber composition prepared by such process.

In additional accordance with the invention the process comprises the additional steps of preparing an assembly of a tire or sulfur vulcanizable rubber with a component (e.g. a tread) comprised of the said rubber composition prepared according to the process of this invention and vulcanizing the assembly at a temperature in a range of about 140° C. to about 190° C.

Accordingly, the invention also thereby contemplates a tire having a component comprised of the rubber composition, particularly a sulfur vulcanized rubber composition prepared by such process.

In the practice of this invention, as hereinbefore pointed out, the rubber composition is comprised of at least one diene-based elastomer, or rubber. Suitable conjugated dienes are isoprene and 1,3-butadiene and suitable vinyl aromatic compounds are styrene and alpha methyl styrene. Thus, it is considered that the elastomer is a sulfur curable elastomer. Such diene based elastomer, or rubber, may be selected, for example, from at least one of cis 1,4-polyisoprene rubber (natural and/or synthetic), and preferably natural rubber, emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubbers, cis 1,4-polybutadiene, medium vinyl polybutadiene rubber (35 to 50 percent vinyl), high vinyl polybutadiene rubber (50 to 90 percent vinyl), styrene/isoprene copolymers, emulsion polymerization prepared styrene/butadiene/acrylonitrile terpolymer rubber and butadiene/acrylonitrile copolymer rubber.

Other and additional diene-based elastomers include specialized solution polymerization prepared high vinyl styrene/butadiene copolymer rubber (HV-S-SBR) having a bound styrene content in a range of about 5 to about 45 percent and a vinyl 1,2-content based upon its polybutadiene portion in a range of from about 30 to about 90 percent, particularly such (HV-S-SBR) having a relatively high onset high glass transition (Tg) value in a range of from about −20° C. to about −40° C. to promote a suitable wet traction for the tire tread and also a relatively high hot rebound value (100° C.) to promote a relatively low rolling resistance for the tread rubber composition intended for relatively heavy duty use. Such specialized high vinyl styrene/butadiene rubber (HV-S-SBR) might be prepared, for example, by polymerization in an organic solution of styrene and 1,3-butadiene monomers to include a chemical modification of polymer chain endings and to promote formation of vinyl 1,2-groups on the butadiene portion of the copolymer. A HV-S-SBR may be, for example, Duradene 738™ from Firestone/Bridgestone.

Other and additional elastomers are functionalized styrene/butadiene copolymer elastomers (functionalized SBR elastomers) containing amine and/or siloxy (e.g. alkoxyl silane as SiOR) functional groups.

Representative of such amine functionalized SBR elastomers is, for example, SLR4601™ from Dow Chemical and T5560™ from JSR, and in-chain amine functionalized SBR elastomers mentioned in U.S. Pat. Nos. 6,735,447 and 6,936,669.

Representative of such siloxy functionalized SBR elastomers is, for example, SLR4610™ from Dow Chemical.

Representative of such combination of amine and siloxy functionalized SBR elastomers is, for example, HPR350™ from JSR.

Other and additional elastomers are functionalized styrene/butadiene copolymer elastomers (functionalized SBR elastomers) containing hydroxy or epoxy functional groups.

Representative of such hydroxy functionalized SBR elastomers is, for example, Tufdene 3330™ from Asahi.

Representative of such epoxy functionalized SBR elastomers is, for example, Tufdene E50™ from Asahi.

In practice, it is therefore envisioned that said sulfur vulcanizable elastomer may be comprised of, for example, polymers of at least one of isoprene and 1,3-butadiene; copolymers of styrene and at least one of isoprene and 1,3-butadiene; high vinyl styrene/butadiene elastomers having a vinyl 1,2-content based upon its polybutadiene in a range of from about 30 to 90 percent and functionalized copolymers comprised of styrene and 1,3-butadiene ("functionalized SBR") selected from amine functionalized SBR, siloxy functionalized SBR, combination of amine and siloxy functionalized SBR, epoxy functionalized SBR and hydroxy functionalized SBR.

The siliceous pigments preferably employed in this invention are precipitated silicas such as, for example, those obtained by the acidification of a soluble silicate, e.g., sodium silicate. Such precipitated silicas are well known to those having skill in such art.

Such precipitated silicas might have, for example, a BET surface area, as measured using nitrogen gas, preferably in the range of about 40 to about 600, and more usually in a range of about 50 to about 300 square meters per gram. A BET method of measuring surface area is described in the *Journal of the American Chemical Society*, Volume 60, understood to include Page 308 in the year 1938.

The silica may also have, for example, a dibutylphthalate (DBP) absorption value in a range of about 100 to about 350, and more usually about 150 to about 300 cc/100 gm.

Various commercially available silicas may be used, for example, only for example herein, and without limitation, silicas commercially available from PPG Industries under the Hi-Sil trademark with designations Hi-Sil 210, 243, etc; silicas available from Rhone-Poulenc, with, for example, designation of Zeosil 1165MP, silicas available from Degussa GmbH with, for example, designations VN2 and VN3, etc and silicas commercially available from Huber having, for example, a designation of Hubersil 8745.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and aforesaid sulfur cure accelerators, as well as processing additives, such as oils, resins including tackifying resins and plasticizers, fillers, pigments, waxes, antioxidants and antiozonants in addition to the aforesaid zinc oxide and fatty acid, particularly stearic acid. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise, for example, from about 1 to about 10 phr, for example, about 1 to about 5 phr. Typical amounts of processing aids may comprise, for example, about 1 to about 50 phr. Such processing aids can include, for example, aromatic, napthenic, and/or paraffinic processing oils. Typical amounts of antioxidants may comprise, for example, about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants may comprise, for example, from about 1 to 5 phr. Typical amounts of waxes, if used, may comprise for example from about 1 to about 5 phr. Often microcrystalline waxes are used. Typical amounts of peptizers if used may comprise for example about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. As known to those skilled in the art, sulfur vulcanizing agents are used, or added in the productive mixing stage, in an amount ranging, for example, from about 0.4 to about 3 phr, or even, in some circumstances, up to about 8 phr, with a range of from about 1.5 to about 2.5, sometimes from 2 to 2.5, being usually preferred.

Accelerators are used to control the time and/or temperature required for vulcanization and to improve the properties of the vulcanizate which have hereinbefore been discussed. A primary accelerator(s) might be used in amounts ranging from, for example only, 0.5 to about 4, alternately about 0.8 to about 1.5, phr. The combination of primary and secondary accelerator may be used with the secondary accelerator usually being used in smaller amounts, for example only, about 0.5 about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a diphenyguanidine, dithiocarbamate or thiuram compound.

The silica-containing rubber composition of this invention can be used for various purposes. For example, it can be used for various tire components such as for example, treads, sidewall, ply coat and wire coat rubber compositions. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Sulfur vulcanizable rubber mixtures containing silica reinforcement were prepared.

Rubber Samples A through H contained various amounts of zinc oxide and long chain fatty acid comprised of stearic acid (at least 90 weight percent stearic acid) as indicated in Table 1 and Table 2 with Samples A and B being comparative control Samples.

For Control Sample A, 6.4 parts (phr) of an alkoxyorganosilane polysulfide coupling agent is used with 3 parts of the zinc oxide being added in the productive (PR) mixing stage and with the precipitated silica, coupling agent and 2 parts of stearic acid being added together in a preceding non-productive (NP) mixing stage where the 2 parts stearic acid used in an amount significantly less than the 3 parts of zinc oxide to form a weight ratio of only about 0.67/1 thereof.

The amount of sulfur curative used was 1.9 parts (phr) together with 3.8 parts of sulfur cure accelerators.

Control Sample B was prepared in the manner of Control Sample A except that 6.4 parts (phr) of an alkoxyorganomercaptosilane coupling agent having its mercapto groups blocked is used.

The sulfur curative was increased somewhat to 2.1 parts and the sulfur cure accelerators to 4.0 parts.

For experimental Sample C, 4 parts (phr) of an organomercaptosilane oligomer coupling agent having its mercapto groups unblocked is used with 3 parts of the zinc oxide being added in the productive (PR) mixing stage and with the precipitated silica, coupling agent and 2 parts of stearic acid being added together in a preceding non-productive (NP) mixing stage with the 2 parts of stearic acid used in an amount significantly less than the 3 parts of zinc oxide to form a weight ratio of only about 0.67/1 thereof.

The sulfur curative was reduced significantly to 1.3 parts to allow for the presence of the unblocked sulfur-containing mercapto groups of the oligomeric organomercaptosilane coupling agent in the sulfur curing of the rubber composition.

Sample D was prepared in the manner of Sample C except that the 2 parts of zinc oxide was added in the same non-productive (NP) mixing stage together with the precipitated silica, 3 parts of stearic acid and coupling agent with 2 parts of stearic acid used in an amount significantly less than the 3 parts of zinc oxide to form a weight ratio of only about 0.67/1 thereof.

The sulfur curative was used at a low level of 1.6 parts to allow for the presence of the unblocked sulfur-containing mercapto groups on the oligomeric organomercaptosilane coupling agent in the sulfur curing of the rubber composition.

Sample E was prepared in the manner of Sample D except that the amount of stearic acid was substantially increased (namely doubled by using 4 parts instead of 2 parts of stearic acid) with the 3 parts of stearic acid used in an amount significantly greater than the 2 parts of zinc oxide to form a weight ratio of about 1.33/1 thereof.

The sulfur curative was increased significantly to 2.1 parts to counter the apparent retarding effect of the increased stearic acid upon the sulfur curing ability of the mercapto groups of the oligomeric organomercaptosilane coupling agent for the sulfur curing of the rubber composition, even though the rubber composition contained the aforesaid unblocked mercapto groups of the oligomeric organomercaptosilane coupling agent.

Sample F was prepared in the manner of Sample C except that an increased level of 6.4 parts of the oligomeric organomercaptosilane coupling agent, and therefore an increased level of the unblocked mercapto groups, was used.

The sulfur curative was used at a significantly low level of 1.1 parts to allow for the presence of the unblocked sulfur-containing mercapto groups of the increased amount of the oligomeric organomercaptosilane coupling agent for the sulfur curing of the rubber composition.

Sample G was prepared in the manner of Sample D (with the use of only 2 parts of stearic acid) except that an increased level of 6.4 parts of the oligomeric organomercaptosilane coupling agent was used.

The sulfur curative was used at a significantly low level of 1.2 parts to allow for the presence of the unblocked sulfur-containing mercapto groups of the increased amount of the oligomeric organomercaptosilane coupling agent for the sulfur curing of the rubber composition.

Sample H was prepared in the manner of Sample G except that the amount of stearic acid was substantially increased (namely doubled by using 4 parts instead of 2 parts of stearic acid) with the 3 parts of stearic acid used in an amount significantly greater than the 2 parts of zinc oxide to form a weight ratio of about 1.33/1 thereof.

The sulfur curative was increased significantly to 1.9 parts (from 1.2 parts, or about a 58 percent increase) to counter the apparent retarding effect of the stearic acid upon the sulfur curing of the rubber composition, even though it contained the aforesaid unblocked mercapto groups of the oligomeric organomercaptosilane coupling agent.

The rubber compositions were prepared by mixing the elastomers(s) together with reinforcing fillers, coupling agent and other rubber compounding ingredients in a first non-productive mixing stage (NP-1) in an internal rubber mixer for about 4 minutes to a temperature of about 170° C. The rubber mixture is then mixed in a second non-productive mixing stage (NP-2) in an internal rubber mixer for about 2 to 3 minutes to a temperature of about 170° C. without adding additional ingredients. The resulting rubber mixture is then mixed in a productive mixing stage (PR) in an internal rubber mixer with sulfur curatives for about 2 minutes to a temperature of about 110° C. The rubber composition is sheeted out and cooled to below 50° C. between each of the non-productive mixing steps and prior to the productive mixing step.

The basic rubber composition formulation is presented in Table 1 and the ingredients are expressed in terms of weight, namely parts by weight (phr) unless otherwise indicated.

TABLE 1

| | Parts |
|---|---|
| Non-Productive Mixing (NP-1) | |
| S-SBR (styrene/butadiene rubber)[1] | 82.5 (60 parts rubber and 22.5 parts oil) |
| Cis 1,4-polybutadiene rubber[2] | 50 (40 parts rubber and 10 parts oil) |
| Silica[3] | 80 |
| Carbon black[4] | 6.4 |
| Rubber processing oil and microcrystalline wax | 11.3 |
| Zinc oxide | 0 and 3 |
| Stearic acid[5] | 2 or 4 |
| Coupling agent A (alkoxy polysulfide)[6] | 0 or 6.4 |
| Coupling agent B (blocked mercapto)[7] | 0 or 6.4 |
| Coupling agent C (oligomer)[8] | 0, 4 or 6.4 |
| Non-Productive Mixing (NP-2) | |
| No ingredients added | |
| Productive Mixing (PR) | |
| Zinc oxide | 0 and 3 |
| Sulfur | variable |
| Primary sulfur cure accelerator(s)[9] | variable |
| Secondary sulfur cure accelerator[10] | variable |
| Optional tertiary sulfur cure accelerator[11] | variable |

[1]Solution polymerization prepared styrene/butadiene copolymer rubber, oil extended, as SLF30H41 ™ from The Goodyear Tire & Rubber Company containing about 40 weight percent bound styrene and composed of 37.5 parts by weight rubber processing oil.
[2]Cis 1,4-polybutadiene rubber, oil extended, as BUD1254 ™ from the Goodyear Tire & Rubber Company
[3]Precipitated silica as 1165MP ™ from Rhodia
[4]Rubber reinforcing carbon black as N330, an ASTM designation
[5]Stearic acid comprised of at least 90 weight percent of stearic acid and a minor amount of other fatty acids comprised of palmitic and oleic acids
[6]Coupling agent A as a liquid bis(3-triethoxysilylpropyl) polysulfide having understood to have an average within a range of from about 2.1 to about 2.4 connecting sulfur atoms in its polysulfidic bridge as Si266 ™ from Degussa
[7]Coupling agent B as a liquid alkoxyorganomercaptosilane with its mercapto moiety being reversibly capped, as NXT ™ from Momentive Performance Materials, formerly GE Silicones.
[8]Coupling agent C as a liquid organomercaptosilane oligomer of the type illustrated by the general formula (I) with its mercapto moiety not being capped or blocked as NXTZ-100 ™ from Momentive Performance Materials, formerly GE Silicones.
[9]Primary sulfur vulcanization accelerator as N-cyclohexylbenzothiazole-2-sulfenamide
[10]Secondary sulfur vulcanization accelerator as diphenylguanidine
[11]Optional tertiary sulfur cure accelerator as tetrabenzylthiuram disulfide The following Table 2 illustrates cure behavior and various physical properties of rubber Samples A through H which contain various amounts of zinc oxide, stearic acid, cure accelerators as well as silica couplers expressed in terms of weight (phr).

Rubber Samples A and B are considered herein as being comparative control rubber Samples.

The parts and percentages of materials are by weight unless otherwise indicated. Where a cured rubber sample was evaluated, such as for the stress-strain, rebound, hardness, tear strength and abrasion measurements, the rubber sample was cured for about 14 minutes at a temperature of about 160° C., unless otherwise indicated.

TABLE 2

| | Control | Control | Samples | | | | | |
|---|---|---|---|---|---|---|---|---|
| | A | B | C | D | E | F | G | H |
| Stearic acid | 2 | 2 | 2 | 2 | 4 | 2 | 2 | 4 |
| Zinc oxide | 3 | 3 | 3 | 3 | 3 | 3 | 3 | 3 |
| Ratio of stearic acid/zinc oxide | 0.67 | 0.67 | 0.67 | 0.67 | 1.33 | 0.67 | 0.67 | 1.33 |
| Zinc oxide stage (step) of addition | PR | PR | PR | NP1 | NP1 | PR | NP1 | NP1 |
| Coupling agent A (alkoxy based) | 6.4 | 0 | 0 | 0 | 0 | 0 | 0 | 0 |
| Coupling agent B (mercapto based) | 0 | 6.4 | 0 | 0 | 0 | 0 | 0 | 0 |

TABLE 2-continued

|  | Control | Control | Samples | | | | | |
|---|---|---|---|---|---|---|---|---|
|  | A | B | C | D | E | F | G | H |
| Coupling agent C (oligomer based) | 0 | 0 | 4 | 4 | 4 | 6.4 | 6.4 | 6.4 |
| Sulfur | 1.9 | 2.1 | 1.3 | 1.6 | 2.1 | 1.1 | 1.2 | 1.9 |
| Primary cure accelerator | 1.9 | 2.1 | 1.68 | 1.96 | 2.44 | 1.35 | 1.46 | 2.21 |
| Secondary cure accelerator | 1.9 | 1.9 | 1 | 1 | 0.35 | 1 | 1 | 0.25 |
| Total primary and secondary cure accelerators | 3.8 | 4.0 | 2.7 | 3.0 | 2.8 | 2.4 | 2.5 | 2.5 |
| Optional tertiary cure accelerator | 0 | 0 | 0 | 0 | 0.1 | 0 | 0 | 0.13 |
| Total sulfur cure accelerators | 3.8 | 4.0 | 2.7 | 3.0 | 2.9 | 2.4 | 2.5 | 2.6 |
| Physical Property | | | | Data | | | | |
| Mooney ML(1 + 4), 100° C. | 73 | 61 | 101 | 81 | 61 | NA | 138 | 66 |
| RPA, 100° C., 11 Hz[1] tan delta | | | | | | | | |
| Cured, 10% strain | 0.133 | 0.129 | 0.132 | 0.126 | 0.115 | NA | 0.162 | 0.091 |
| Stress-strain (ATS)[2] | | | | | | | | |
| Tensile strength (MPa) | 14.2 | 15.7 | 12.0 | 13.1 | 16.4 | NA | 12.6 | 18.4 |
| Elongation at break (%) | 504 | 541 | 487 | 497 | 513 | NA | 603 | 496 |
| 100% modulus, ring (MPa) | 1.41 | 1.6 | 1.26 | 1.24 | 1.57 | NA | 1.02 | 1.62 |
| 300% modulus, ring (MPa) | 7.36 | 7.66 | 6.48 | 6.49 | 8.31 | NA | 4.67 | 8.92 |
| Modulus ratio (300/100) | 5.2 | 4.8 | 5.1 | 5.2 | 5.3 | NA | 4.6 | 5.5 |
| Rebound | | | | | | | | |
| 100° C. | 59 | 63 | 57 | 59 | 65 | NA | 47 | 65 |
| DIN abrasion[3], 10N, | | | | | | | | |
| Relative volume loss | 132 | 139 | 132 | 128 | 121 | NA | 158 | 108 |

PR = Productive mixing stage
NP = Non-productive mixing stage
NA = data not obtained for Sample F because product was a fine powder
[1]Data according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.
[2]Data according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Data according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.

Samples E and H represent a practice of this invention under conditions hereinbefore discussed.

It can be seen from Table 2, that an equal or reduced Mooney viscosities of 61 and 66, respectively, are observed for the uncured Rubber Samples E and H which contained the oligomeric polyorganomercaptosilane coupling agent (compared to Control Rubber Samples A and B), where Rubber Samples E and H:

(A) contained a substantial increase in the stearic acid ingredient, (B) contained a weight ratio of stearic acid to zinc oxide of about 1.33/1, (C) addition of the zinc oxide was in the non-productive mixing stage instead of the productive mixing stage, (D) an increase in sulfur curative was added in the productive mixing stage to allow for the aforesaid apparent negative sulfur rubber curing effect of the increased stearic acid content on the unblocked mercapto group-containing oligomeric organomercaptosilane coupling agent.

This is considered herein to be significant in a sense of enabling equal or improved rubber processability (equal or lower Mooney viscosity) for the precipitated silica reinforcement-containing rubber composition to be prepared with the oligomeric organomercaptosilane coupling agent.

It can also be seen from Table 2, that a significant lower hysteresis physical property (lower tan delta value of 0.115 and 0.091, respectively) was observed for Rubber Samples E and H (compared to Rubber Samples A through D, F and G).

This is considered herein to be significant in a sense of promoting lower internal 0heat generation in a tire component (e.g. tire tread) during working of the tire which, in turn, promotes better fuel economy for a vehicle having tires with treads of such rubber composition. It also promotes better durability for such tire tread in a sense of promoting a cooler running tire tread.

It can further be seen in Table 2 that somewhat higher hot rebound value of 65 was observed for Rubber Samples E and H (as compared to Rubber Samples A through D, F and G).

This is also considered herein to be significant in a sense of promoting lower internal heat generation in a tire component (e.g. tire tread) during working of the tire which, in turn, promotes better fuel economy for a vehicle having tires with treads of such rubber composition.

It can also be seen from Table 2, that higher tensile strengths were observed for Rubber Samples E and H of 16.4 and 18.4, respectively, (as compared to Rubber Samples A through D, F and G).

It can further be seen from Table 2 that a somewhat similar elongation at break for Rubber Samples E and H of 513 and 496 percent, respectively, is observed as compared to Rubber Samples A through D, F and G, which is an indication of acceptable sulfur cure density even with the appreciably higher stearic acid content.

It can also be seen from Table 2 that lower DIN abrasion loss of 121 and 108, respectively, was experienced for Samples E and H (as compared to Rubber Samples A through D, F and G). This is considered as being significant in a sense of promoting better wear resistance for the rubber composition, particularly for a tire tread running surface.

It is considered herein to be important to promote a balance between rubber processing in a sense of Mooney viscosity for the uncured rubber composition and physical properties of the cured rubber composition in a sense of its tan delta and rebound (hysteresis), tensile strength, elongation, and DIN abrasion.

Accordingly, for the purposes of this invention, an increased level to 4 phr of the stearic acid, together with a stearic acid/zinc oxide weight ratio of greater than 1, namely 1.33, (Rubber Samples E and H, respectively) was observed to be desirable for the silica-rich rubber composition which contains the organomercaptosilane oligomer coupling agent.

As a result, in one aspect, it is considered herein that the inclusion of the aforesaid higher levels of the stearic acid (and associated ratio of stearic acid to zinc oxide of at least 1) combined with higher levels of sulfur curative (Samples E and H) indicate a combination of suitable uncured viscosity (Mooney viscosity) reduction for the uncured rubber composition as well as reduced hysteresis of the cured rubber composition can occur when using the higher levels of stearic acid, higher stearic acid/zinc oxide ratio and higher curative inclusion.

This is considered herein to be a clearly unusual manipulation of the compounding of the rubber composition to obtain an optimum property for a precipitated silica reinforcement-containing rubber composition with the oligomeric organomercaptosilane coupling agent in a manner which is considered herein to be novel, a departure from past practice and not obvious to one having skill in such art without considerable experimental trial with the result being uncertain.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a rubber composition comprises the sequential steps of, based upon parts by weight per 100 parts by weight rubber (phr):
   (A) thermomechanically mixing in at least one non-productive mixing step, in the absence of sulfur and sulfur cure accelerator, in an internal rubber mixer to a temperature within a range of about 140° C. to about 190° C. for such mixing step(s):
      (1) 100 parts by weight of at least one sulfur vulcanizable diene-based elastomer selected from conjugated diene homopolymers and copolymers and copolymers of styrene [vinyl aromatic compound (e.g. styrene)] and at least one conjugated diene;
      (2) about 10 to about 120 phr of particulate reinforcing filler comprised of precipitated silica and rubber reinforcing carbon black, wherein said reinforcing filler contains from 10 to about 110 weight percent precipitated silica;
      (3) an oligomeric organomercaptosilane based coupling agent,
      wherein said organomercaptosilane oligomer is the product of reacting a 2-methyl-1,3-propane diol with S-[3-(triethoxvsilyl)propyl] thiooctanaote, and
      (4) combination of zinc oxide and long chain fatty acid comprised of about 3 phr of zinc oxide and about 4 phr of long chain fatty acid comprised of at least 90 percent by weight of stearic acid and less than 10 percent of long chain fatty acids;
      wherein said zinc oxide and said long chain fatty acid are mixed in at least one non-productive mixing step with said diene-based elastomer(s)in an internal rubber mixer and wherein said zinc oxide and said long chain fatty acid are added coincidentally with or prior to the addition of said organomercaptosilane oligomer, and
      wherein said zinc oxide is mixed with said diene-based elastomer(s) in said non-productive mixing step(s) exclusive of mixing zinc oxide with said diene-based elastomer(s) in a subsequent productive mixing step;
   (B) subsequently blending with the resultant rubber composition of said non-productive mixing step(s), in a final thermomechanical productive mixing step at a temperature in a range of about 100° C. to about 120° C., elemental sulfur and at least one sulfur vulcanization accelerator;
   wherein said oligomeric organomercaptosilane is comprised of a plurality of mercapto and silane moieties and wherein from 50 to about 100 percent of said mercapto groups are not chemically blocked.

2. A rubber composition prepared by the process of claim 1.

3. A tire having a component comprised of the rubber composition of claim 2.

* * * * *